(12) United States Patent
Stoll

(10) Patent No.: US 7,386,911 B2
(45) Date of Patent: Jun. 17, 2008

(54) APPARATUS FOR DISLODGING AND REMOVING CONTAMINANTS FROM A SURFACE OF A MACHINE TOOL

(75) Inventor: Alexander Stoll, Plymouth, MI (US)

(73) Assignee: Ford Motor Company, Dearborn, MI (US)

( * ) Notice: Subject to any disclaimer, the term of this patent is extended or adjusted under 35 U.S.C. 154(b) by 772 days.

(21) Appl. No.: 10/904,459

(22) Filed: Nov. 11, 2004

(65) Prior Publication Data
US 2006/0096624 A1    May 11, 2006

(51) Int. Cl.
*A47L 5/00* (2006.01)

(52) U.S. Cl. .......................... 15/160; 15/301; 15/312.1; 15/344; 15/339; 29/81.12; 408/58; 408/60; 408/61; 408/76

(58) Field of Classification Search ............ None
See application file for complete search history.

(56) References Cited

U.S. PATENT DOCUMENTS

| 2,619,009 A | 11/1952 | Begle |
| 2,944,465 A | 7/1960 | Jones |
| 3,837,383 A | 9/1974 | Ko |
| 3,880,047 A | 4/1975 | Dosier |
| 4,935,981 A | 6/1990 | Ohtani et al. |
| 5,474,116 A | 12/1995 | Shoda |
| 5,685,039 A | 11/1997 | Hamada et al. |
| 5,956,791 A | 9/1999 | Bassi et al. |
| 6,061,865 A | 5/2000 | Susnjara et al. |
| 6,079,078 A | 6/2000 | Byington |

FOREIGN PATENT DOCUMENTS

| DE | 33 20 598 A1 | 12/1984 |
| DE | 42 06 587 A1 | 9/1993 |
| EP | 1179388 | 2/2002 |

*Primary Examiner*—David A Redding
(74) *Attorney, Agent, or Firm*—Raymond Coppiellie; Brooks Kushman P.C.

(57) ABSTRACT

An apparatus for dislodging and removing contaminants from a surface of a machine tool. The apparatus includes an arbor, a vacuum source, a tube, and a cleaning member disposed proximate a distal end of the tube. The cleaning member contacts a surface of the machine tool to dislodge contaminants. The contaminants are drawn through the tube by the vacuum source.

20 Claims, 2 Drawing Sheets

APPARATUS FOR DISLODGING AND REMOVING CONTAMINANTS FROM A SURFACE OF A MACHINE TOOL

BACKGROUND OF THE INVENTION

1. Field of the Invention

The present invention relates to an apparatus for removing contaminants from a surface of a machine tool, and more particularly to a cleaning apparatus that is selectively coupled to and movable by a machine tool to dislodge and vacuum contaminants.

2. Background Art

Machine tools can perform a variety of operations to shape and finish a part. Contaminants such as chips, dust, and lubricants are dispersed onto surfaces of the machine tool when such operations are performed. These contaminants must be periodically removed to maintain the stability and quality of the machining process.

Previously, operators cleaned machine tools by spraying pressurized air or coolant against contaminated surfaces to dislodge particulates. These manual operations were messy, time consuming, labor intensive, and resulted in increased machine downtime and associated costs.

Previously, apparatuses for providing a vacuum around a cutting tool were known in the dust collector art, such as that described in U.S. Pat. No. 3,837,383. However, such dust collecting apparatuses did not remove contaminants from machine tool housing surfaces, did not incorporate a rotatable cleaning member, and did not incorporate a spindle-mounted vacuum source.

Before applicant's invention, there was a need for an apparatus for efficiently cleaning a machine tool surface without extensive operator involvement. In addition, there was a need for an apparatus that incorporated a moveable cleaning member for effectively dislodging contaminants as well as a vacuum source for transporting contaminants from the cleaned surface. In addition, there was a need for an apparatus having a cleaning mechanism that could be actuated by a variety of power sources to accommodate various machine tool configurations. Problems associated with the prior art as noted above and other problems are addressed by applicant's invention as summarized below.

SUMMARY OF THE INVENTION

According to one aspect of the present invention, an apparatus for dislodging and removing contaminants from a surface of a machine tool is provided. The machine tool includes a spindle adapted to turn about an axis of rotation and a housing disposed around and spaced apart from the spindle. The apparatus includes an arbor, a vacuum source, a tube, and a cleaning member. The arbor is adapted to attach to the spindle. The vacuum source is disposed proximate the arbor. The tube is disposed proximate the vacuum source and has a distal end. The cleaning member is disposed proximate the distal end. The cleaning member contacts a surface of the housing to dislodge contaminants. The contaminants are drawn through the tube by the vacuum source. This apparatus permits various machine tool, workpiece, or fixture surfaces to be efficiently cleaned with reduced mess and operator involvement and improves space-efficiency.

The cleaning member may be a wiper or a plurality of bristles. A portion of the cleaning member may be disposed in the tube or outside the distal end of the tube.

The apparatus may include a shaft disposed between the arbor and the cleaning member and adapted to rotate the cleaning member about the axis of rotation. The shaft may include a helical surface extending at least partially between the arbor and the cleaning member to facilitate the movement of contaminants away from the cleaning member.

The tube may include a slot disposed proximate the distal end for receiving contaminants. The slot allows the apparatus to capture or scoop up accumulated contaminants and improves the flexibility and utility of the apparatus.

The vacuum source may include a housing and an anti-rotation pin configured to inhibit rotation of the housing when the spindle turns about the axis of rotation.

According to another aspect of the present invention, an apparatus for dislodging and vacuuming contaminants from an interior surface of a machine tool is provided. The machine tool includes a spindle and a housing. The apparatus includes an arbor, a vacuum source, a tube, and a rotating cleaning mechanism. The arbor is adapted to attach to the spindle. The vacuum source is disposed proximate the arbor. The tube is disposed proximate the vacuum source and has a distal end. The rotating cleaning mechanism is disposed proximate the distal end and has a cleaning member. The rotating cleaning mechanism is adapted to rotate the cleaning member about an axis of rotation. Contaminants are dislodged and drawn through the tube by the vacuum source when the cleaning member contacts the interior surface.

At least a portion of the cleaning member may extend parallel to the axis of rotation.

The rotating cleaning mechanism may include a bearing, a mounting plate, and a power source. The bearing may be disposed proximate the distal end. The mounting plate may be disposed proximate the bearing and may be configured to receive the cleaning member. The power source may be adapted to rotate the mounting plate and cleaning member about the axis of rotation. The rotating cleaning mechanism may also include a tubular housing, an inlet, and a set of vanes extending from the mounting plate and disposed within the tubular housing. Such a configuration provides the flexibility to rotate the cleaning member independent of the spindle.

The power source may be adapted to provide a pressurized fluid to exert force on the set of vanes to rotate the cleaning member about the axis of rotation. The power source may be an electrical motor, air compressor, or hydraulic fluid source.

According to another aspect of the present invention, an apparatus for dislodging and vacuuming contaminants from an interior surface of a machine tool is provided. The machine tool includes a spindle and a housing disposed around and spaced apart from the spindle. The apparatus includes an arbor, a vacuum source, a tube, and a cleaning mechanism. The arbor is adapted to attach to the spindle. The vacuum source is disposed proximate the arbor. The tube is disposed proximate the vacuum source and has a distal end. The cleaning mechanism is disposed proximate the distal end and has a cleaning member. The cleaning mechanism is adapted to rotate the cleaning member about an axis of rotation. The machine tool moves the cleaning member to contact a surface of the housing to dislodge contaminants. The contaminants are drawn through the tube by the vacuum source.

The cleaning mechanism may include a counterweight, a mounting plate, and a shaft. The mounting plate may be configured to receive the cleaning member. The shaft may be disposed between the arbor and the cleaning member and may be adapted to rotate the cleaning member when the spindle turns. The mounting plate may also include an aperture configured to allow contaminants to enter the tube.

DETAILED DESCRIPTION OF THE PREFERRED EMBODIMENT(S)

Figure 1:
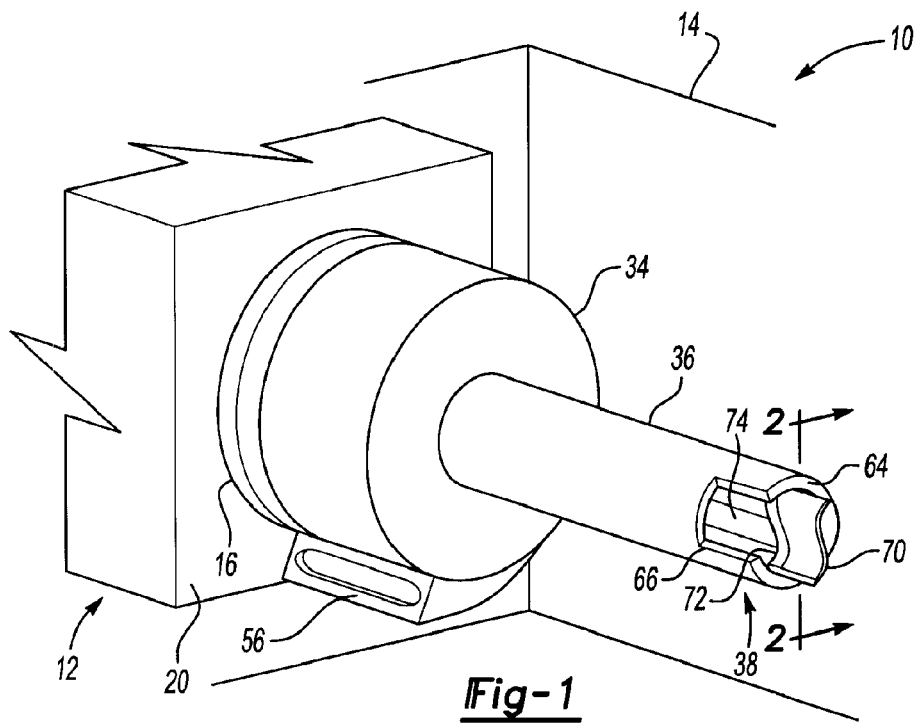
FIG. 1 is a perspective view of one embodiment of a cleaning apparatus having a cleaning mechanism.

Referring to FIG. 1, a machine tool 10 is shown. The machine tool 10 may be of any suitable type, such as a computer numerical control (CNC) machine tool, press, or assembly device. In addition, the machine tool 10 may be configured to perform any suitable shaping or finishing operation, such as cutting, shaving, turning, boring, drilling, grinding, reaming, deburring, tapping, forming, milling or polishing.

In the embodiment shown in FIG. 1, the machine tool 10 includes a spindle assembly 12 and a housing 14. The spindle assembly 12 includes a spindle 16 adapted to rotate about an axis of rotation 18 and a spindle case 20. The spindle 16 may be turned by any suitable device, such as a motor, and at any suitable speed. In addition, the machine tool 10 may be configured to move the spindle assembly 12 along different axes, such as X, Y, and/or Z axes in a manner known by those skilled in the art.

The housing 14 includes a plurality of panels disposed around and spaced apart from the spindle assembly 12. The housing 14 may have any suitable configuration and may include doors and/or windows. The housing 14 may be made of any suitable material, such as sheet metal. The housing 14 inhibits contaminants, such as chips, dust, lubricants, and oil mist, from escaping to the surrounding environment.

Figure 2:
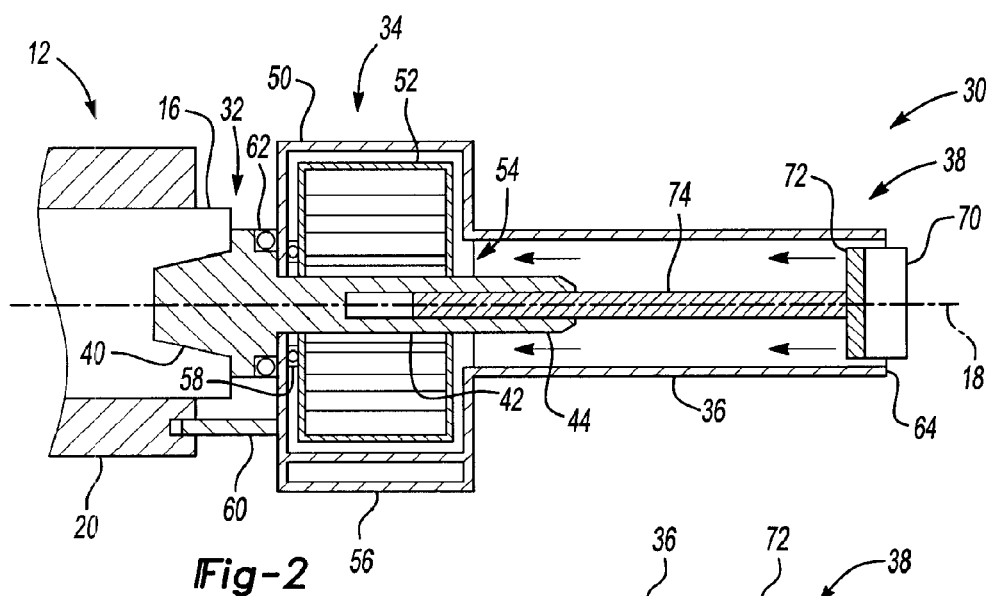
FIG. 2 is a section view of the cleaning apparatus of FIG. 1 along section 2-2.

Referring to FIGS. 1 and 2, one embodiment of a cleaning apparatus 30 is shown. In this embodiment, the cleaning apparatus 30 includes a coupling member or arbor 32, a vacuum source 34, a tube 36, and a cleaning mechanism 38.

The arbor 32 is adapted to selectively couple the cleaning apparatus 30 to the spindle 16. The arbor 32 may be of any suitable type, such as a friction coupling or a quick connect coupling. In addition, the arbor 32 may have any suitable configuration. In the embodiment shown in FIG. 2, the arbor 32 includes a spindle mating portion 40 and a body portion 42 having a tubular section 44. The spindle mating portion 40 is adapted to engage the spindle 16. The body portion 42 is disposed adjacent to the spindle mating portion 40 and extends along the axis of rotation 18.

The vacuum source 34 may be disposed proximate the arbor 32. The vacuum source 34 may be of any suitable type, such as a Mapal turbo drill. In the embodiment shown, the vacuum source 34 includes a housing 50 and a blower 52. The housing 50 includes an inlet 54 and an outlet 56. The blower 52 is disposed within the housing 50 and is adapted to provide suction to draw gases and contaminants through the inlet 54 and expel gases and contaminants through the outlet 56. The blower 52 may be of any suitable type, such as a centrifugal blower wheel, and may be driven by the spindle or another power source. A first bearing 58 may be disposed between the blower 52 and the housing 50 to facilitate rotation of the blower 52. Optionally, a remote vacuum source may be employed that is connected to the tube 36 by a hose.

Optionally, the housing 50 may include an anti-rotation pin 60. The anti-rotation pin 60 may engage a hole disposed on a non-rotating machine tool surface or component, such as the spindle case 20. The anti-rotation pin 60 inhibits rotation of the housing 50 when the arbor 32 and/or blower 52 are rotated. Optionally, the anti-rotation pin 60 may be a conduit for providing pneumatic, hydraulic, or electrical power to drive or provide additional torque to a cleaning member. In addition, a second bearing 62 may be disposed between the arbor 32 and the housing 50 to facilitate rotation of the arbor 32.

The tube 36 is disposed proximate the inlet 54 and includes a distal end 64 disposed away from the vacuum source 34. The tube 36 may have any suitable configuration. In the embodiment shown in FIGS. 1 and 2, the tube 36 is disposed coaxially with the axis of rotation 18. Alternately, the tube 36 may be angled or curved at any suitable angle. In addition, the tube 36 may have a fixed or adjustable length.

Optionally, the tube 36 may include a cutaway portion or slot 66 disposed near the distal end 64. The slot 66 is configured to provide an additional opening for gathering contaminants. For example, the slot 66 may be positioned proximate to an accumulation of contaminants, such as chips, and scoop the chips when the spindle assembly 12 is advanced. Optionally, one or more fixed position cleaning members may be disposed proximate the slot 66.

Figure 3:
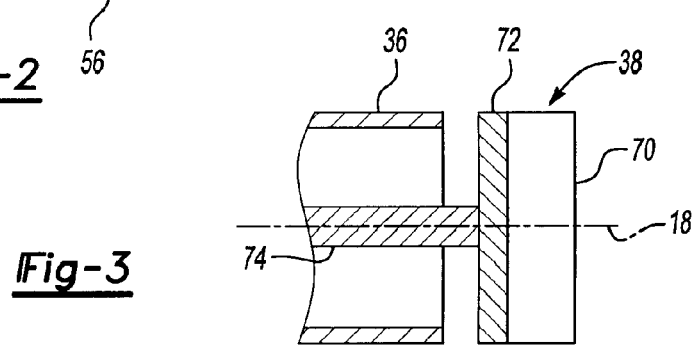
FIG. 3 is a section view of a portion of a second embodiment of the cleaning apparatus.

The cleaning mechanism 38 is disposed near the distal end 64. The cleaning mechanism 38 includes one or more cleaning members 70 adapted to contact a machine tool surface, such as the housing 14, workpiece holding fixtures, and/or material handling pallets, to dislodge contaminants. In addition, the cleaning mechanism 38 may also includes a mounting plate 72 and a shaft 74. The cleaning mechanism 38 may be at least partially disposed in the tube 36 as shown in FIG. 2 or may be disposed outside the tube 36 as shown in FIG. 3.

The cleaning member 70 may be of any suitable type, such as a brush, bristles, wiper, or flap made of a woven or lofted material. In addition, different types of cleaning members may be used in any combination. In the embodiment shown in FIGS. 1 and 2, the cleaning member 70 is a wiper and has an "S" configuration. The wiper may be made of any suitable material, such as rubber, nylon, spring steel, or a polymeric material like ultrahigh molecular weight polypropylene (UHMW-PP). In addition, the tip of the wiper may be flat, angled, pointed, or rounded. If multiple wipers are employed, the wipers may have different heights and/or different tip designs.

The mounting plate 72 is adapted to receive the cleaning member 70 and permit gases and contaminants to enter the distal end 64 of the tube 36. More particularly, the cleaning member 70 may be disposed on the mounting plate 72 in any suitable manner and at any suitable orientation. For example, the cleaning member 70 may be inserted into a slot or hole in the mounting plate 72 or may be attached with adhesives, fasteners, or by sonic welding. Optionally, the mounting plate 72 and/or cleaning member 70 may be spring-loaded or mounted on a flexible member to allow the cleaning member 70 to follow the contour of the contacted surface.

Figure 4:
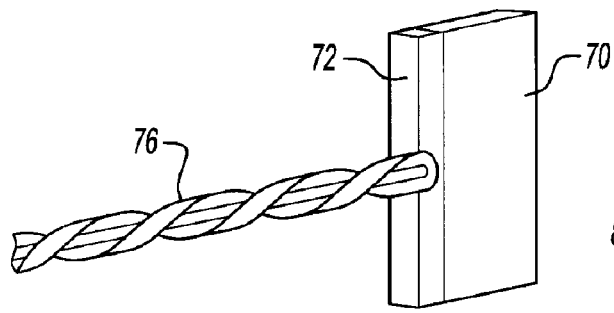
FIG. 4 is a perspective view of an alternate embodiment of the cleaning mechanism.

The shaft 74 is disposed between the arbor 32 and the cleaning member 70 or mounting plate 72. In the embodiment shown in FIG. 2, the shaft 74 is coupled to the tubular section 44 of the arbor 32. The shaft 74 may have any suitable configuration. In the embodiment shown in FIG. 2, the shaft 74 has a cylindrical shape. Optionally, the shaft 74 may include one or more helical surfaces 76 as shown in FIG. 4. The helical surface 76 at least partially extends between the arbor 32 and the cleaning member 70 or mounting plate 72 and facilitate the movement of contaminants toward the vacuum source 34. In addition the shaft may be connected to a transmission that is disposed between the spindle assembly 12 and the cleaning member 70 to control the rotational velocity of the cleaning member 70.

Figure 5:
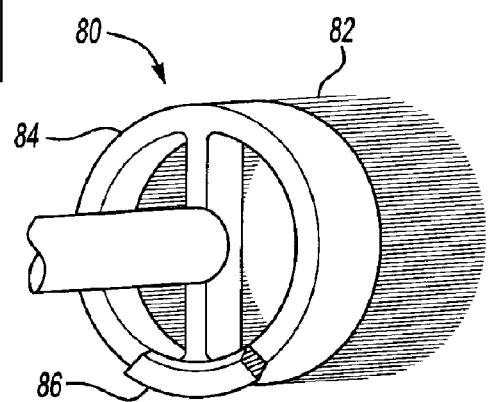
FIG. 5 is a perspective view of another embodiment of the cleaning mechanism.

Referring to FIG. 5, another embodiment of the cleaning mechanism is shown. In this embodiment, the cleaning mechanism 80 includes a cleaning member 82 configured as a plurality of bristles and a mounting plate 84. The bristles may be made of any suitable material, such as a polymeric material like nylon or a metal like brass. In addition, the bristles may have any suitable configuration. For example, multiple rows and/or lengths of bristles may be employed. The rows may be configured in any suitable pattern, including linear, curved, spiral, and/or serpentine patterns. In addition, the bristles may be positioned at any suitable angle and may be coated or uncoated and static or dynamic.

The mounting plate 84 is adapted to receive the cleaning member 82 and permit gases and contaminants to enter the distal end 64 of tube 36. More particularly, the cleaning member 82 may be attached to the mounting plate 84 in any suitable manner and at any suitable orientation. The mounting plate 84 may include one or more holes that may extend through the mounting plate 84 proximate the cleaning mechanism 80 to provide localized airflow. For instance, a plurality of holes may be spaced apart and located near the bristles to provide localized suction or turbulence to help remove or dislodge particulates from a surface and/or the bristles. Optionally, the cleaning member 82 and/or mounting block 84 may be spring-loaded or mounted on a flexible member to allow the cleaning member 82 and/or mounting block 84 to flex and follow the contour of the contacted surface.

Optionally, the mounting plate 84 may include a counterweight 86. The counterweight 86 facilitates the removal of contaminants when the rotation of the spindle 16 is "pulsed" as described in greater detail below.

Figure 6:
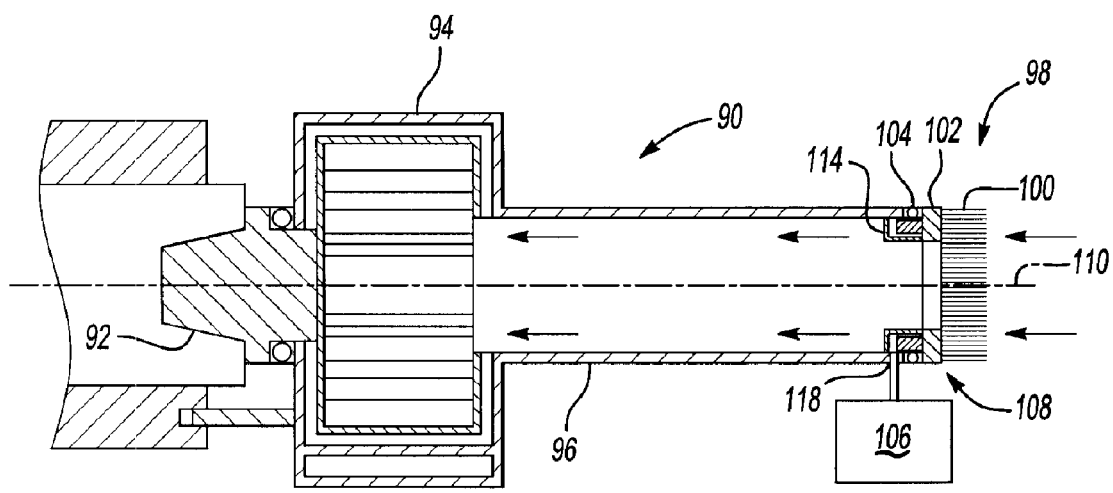
FIG. 6 is a section view of a third embodiment of the cleaning apparatus.
Figure 7:
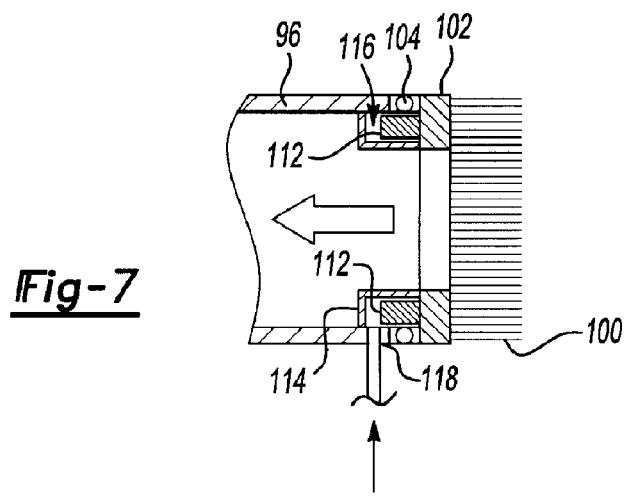
FIG. 7 is a magnified section view of the cleaning apparatus of FIG. 6.

Referring to FIGS. 6 and 7, another embodiment of a cleaning apparatus is shown. In this embodiment, the cleaning apparatus 90 includes an arbor 92, a vacuum source 94, a tube 96, and a cleaning mechanism 98. The cleaning mechanism 98 includes a cleaning member 100, a mounting plate 102, a bearing 104, and a power source 106.

The cleaning member 100 is disposed on the mounting plate 102. The cleaning member 100 may be of any suitable type and may have any suitable configuration as previously discussed. In the embodiment shown, the cleaning member 100 is configured as a plurality of bristles.

The bearing 104 is disposed between the distal end of the tube 96 and the mounting plate 102. The bearing 104 facilitates rotation of the mounting plate 102 and cleaning member 100 about an axis of rotation 110.

The power source 106 is adapted to rotate the cleaning member 100 or mounting plate 102. The power source 106 may be of any suitable type, such as an electric motor, pneumatic power source, or hydraulic power source. In addition, the vacuum pressure provided by the vacuum source 94 may be used to rotate the cleaning member 100.

In an embodiment incorporating a hydraulic or pneumatic power source, the cleaning mechanism 98 may include a set of vanes 112 and a housing 114. The vanes 112 are disposed on the mounting plate 102 opposite the cleaning member 100. The housing 114 is disposed proximate the mounting plate 102 and the tube 96. More particularly, the housing 114 defines a chamber 116 in which the vanes 112 are disposed. In the embodiment shown, the housing 114 is generally ring-shaped and may include a seal (not shown) disposed between the mounting plate 102 and an adjacent wall of the housing to facilitate rotation of the mounting plate 102 while providing a fluid-tight seal.

A pressurized fluid, such as air or hydraulic fluid, may be provided through an inlet 118 to exert force on the vanes 112 to rotate the mounting plate 102 and cleaning member 100. The inlet 118 may be disposed in the tube 96 between the bearing 104 and the vacuum source 94.

A method for dislodging and removing contaminants from a machine tool surface using the cleaning apparatus embodiments previously described will now be discussed.

First, the cleaning apparatus is coupled to the spindle with the arbor as previously described.

Second, the vacuum source is activated to provide suction through the tube.

Third, the cleaning mechanism is rotated using the spindle or another power source as previously described.

Fourth, the spindle assembly is positioned so that the cleaning apparatus is located adjacent to the surface to be cleaned. As the cleaning mechanism is rotated, the cleaning member dislodges contaminants from the surface. The spindle 16 may be rotated at a constant rotational speed or multiple rotational speeds. In addition, the spindle 16 may be "pulsed" to alter the rotational speed. For example, the counterweight may be powered by a rotating cam shaft that occasionally provides an impulse or force to the counterweight or cleaning mechanism to facilitate rotational movement. During pulsed operation, the counterweight may provide inertia to maintain rotation of the cleaning member. Moreover, the spindle may rotate in different directions. For example, the spindle may alternate between clockwise and counterclockwise directions to scrub contaminants off surfaces of the machine tool.

Fifth, the spindle assembly and cleaning apparatus are moved along one or more axes, such as X, Y, and/or Z axes to dislodge and transport contaminants from additional regions or machine tool surfaces. Moreover, the spindle assembly and cleaning apparatus may be continuously or intermittently actuated along an axis or combination of axes to contact or scrub a surface.

While the best mode for carrying out the invention has been described in detail, those familiar with the art to which this invention relates will recognize various alternative designs and embodiments for practicing the invention as defined by the following claims.

What is claimed is:

1. An apparatus for dislodging and removing contaminants from a surface of a machine tool, the machine tool having a spindle adapted to turn about an axis of rotation and a housing disposed around and spaced apart from the spindle, the apparatus comprising:
   an arbor adapted to attach to the spindle;
   a vacuum source disposed proximate the arbor, the vacuum source having a vacuum source housing and an anti-rotation pin configured to inhibit rotation of the vacuum source housing when the spindle turns about the axis of rotation;

a tube disposed proximate the vacuum source, the tube having a distal end; and a cleaning member disposed proximate the distal end;

wherein the cleaning member is adapted to contact a surface of the housing to dislodge contaminates and the vacuum source is adapted to draw the contaminates through the tube.

2. The apparatus of claim 1 wherein the cleaning member is a wiper.

3. The apparatus of claim 1 wherein the cleaning member is a plurality of bristles.

4. The apparatus of claim 1 wherein at least a portion of the cleaning member is disposed in the tube.

5. The apparatus of claim 1 wherein the cleaning member is disposed outside the distal end.

6. The apparatus of claim 1 further comprising a shaft disposed between the arbor and the cleaning member, the shaft being adapted to rotate the cleaning member about the axis of rotation.

7. The apparatus of claim 6 wherein the shaft includes a helical surface extending at least partially between the arbor and the cleaning member to facilitate the movement of contaminants away from the cleaning member.

8. The apparatus of claim 1 wherein the tube further comprises a slot disposed proximate the distal end for receiving contaminants.

9. The apparatus of claim 1 wherein the vacuum source housing includes an outlet.

10. An apparatus for dislodging and vacuuming contaminants from an interior surface of a machine tool, the machine tool having a spindle, the apparatus comprising:

an arbor adapted to attach to the spindle;

a vacuum source disposed proximate the arbor;

a tube disposed proximate the vacuum source, the tube having a distal end; and a rotating cleaning mechanism disposed proximate the distal end and having a cleaning member, the rotating cleaning mechanism adapted to rotate the cleaning member about an axis of rotation;

wherein contaminants are dislodged and drawn through the tube by the vacuum source when the cleaning member contacts the interior surface.

11. The apparatus of claim 10 wherein at least a portion of the cleaning member extends parallel to the axis of rotation.

12. The apparatus of claim 10 wherein the rotating cleaning mechanism further comprises a bearing disposed proximate the distal end, a mounting plate disposed proximate the bearing and configured to receive the cleaning member, and a power source adapted to rotate the mounting plate and cleaning member about the axis of rotation.

13. The apparatus of claim 12 wherein the power source is an electric motor.

14. The apparatus of claim 12 wherein the rotating cleaning mechanism further comprises a tubular housing, an inlet, and a set of vanes extending from the mounting plate and disposed within the tubular housing, wherein the power source is adapted to provide a pressurized fluid to the housing via the inlet to exert force on the set of vanes to rotate the cleaning member about the axis of rotation.

15. The apparatus of claim 14 wherein the power source is an air compressor.

16. The apparatus of claim 14 wherein the power source provides hydraulic fluid.

17. An apparatus for dislodging and vacuuming contaminants from an interior surface of a machine tool, the machine tool having a spindle and a housing disposed around and spaced apart from the spindle, the apparatus comprising:

an arbor adapted to attach to the spindle;

a vacuum source disposed proximate the arbor;

a tube disposed proximate the vacuum source, the tube having a distal end; and a cleaning mechanism disposed proximate the distal end and having a cleaning member, the cleaning mechanism being adapted to rotate the cleaning member about an axis of rotation;

wherein the machine tool moves the cleaning member to contact a surface of the housing to dislodge contaminates and the contaminates are drawn through the tube by the vacuum source.

18. The apparatus of claim 17 wherein the cleaning mechanism includes a counterweight.

19. The apparatus of claim 17 wherein the cleaning mechanism includes a mounting plate configured to receive the cleaning member and a shaft disposed between the arbor and the cleaning member, the shaft being adapted to rotate the cleaning member when the spindle turns.

20. The apparatus of claim 19 wherein the mounting plate includes an aperture configured to allow contaminants to enter the tube.

* * * * *